United States Patent
Rothschild

(10) Patent No.: US 8,396,931 B2
(45) Date of Patent: Mar. 12, 2013

(54) INTERACTIVE, MULTI-USER MEDIA DELIVERY SYSTEM

(75) Inventor: Leigh M. Rothschild, Sunny Isles Beach, FL (US)

(73) Assignee: Portulim Foundation LLC, Wilmington, DE (US)

( * ) Notice: Subject to any disclaimer, the term of this patent is extended or adjusted under 35 U.S.C. 154(b) by 0 days.

(21) Appl. No.: 12/771,004

(22) Filed: Apr. 30, 2010

(65) Prior Publication Data

US 2010/0211650 A1 Aug. 19, 2010

Related U.S. Application Data

(63) Continuation of application No. 09/997,477, filed on Nov. 20, 2001, now Pat. No. 7,711,774.

(51) Int. Cl.
G06F 15/16 (2006.01)
H04N 7/18 (2006.01)

(52) U.S. Cl. .......................................... 709/206; 725/80

(58) Field of Classification Search .................... 348/15; 709/206; 725/80
See application file for complete search history.

(56) References Cited

U.S. PATENT DOCUMENTS

| | | |
|---|---|---|
| 4,641,253 A | 2/1987 | Mastran |
| 4,785,472 A | 11/1988 | Shapiro |
| 5,087,980 A | 2/1992 | Staffer |
| 5,119,474 A | 6/1992 | Beitel et al. |
| 5,274,758 A | 12/1993 | Beitel et al. |
| 5,365,579 A | 11/1994 | Hendrickson |
| 5,394,548 A | 2/1995 | Nakajima et al. |
| 5,404,437 A | 4/1995 | Nguyen |
| 5,430,835 A | 7/1995 | Williams et al. |
| 5,440,677 A | 8/1995 | Case et al. |
| 5,467,288 A | 11/1995 | Fasciano et al. |
| 5,479,268 A | 12/1995 | Young et al. |
| 5,553,221 A | 9/1996 | Reimer et al. |
| 5,559,949 A | 9/1996 | Reimer et al. |
| 5,583,980 A | 12/1996 | Anderson |
| 5,596,705 A | 1/1997 | Reimer et al. |
| 5,624,265 A | 4/1997 | Redford et al. |
| 5,640,560 A | 6/1997 | Smith |
| 5,642,477 A | 6/1997 | De Carmo et al. |
| 5,675,511 A | 10/1997 | Prasad et al. |
| 5,696,905 A | 12/1997 | Reimer et al. |
| 5,715,400 A | 2/1998 | Reimer et al. |
| 5,758,093 A | 5/1998 | Boezeman et al. |

(Continued)

FOREIGN PATENT DOCUMENTS

| | | |
|---|---|---|
| WO | WO-99/26415 | 5/1999 |
| WO | WO-02/15024 | 2/2002 |

OTHER PUBLICATIONS

Harry Newton, Newton's Telecom Dictionary, 1998, Telecom Books and Flatiron Publishing, Expanded Edition.*

(Continued)

Primary Examiner — Philip Lee

(57) ABSTRACT

An interactive, multi-user media delivery system having a number of media storage mediums, each of containing a particular media selection, and a number of media players structured to selectively deliver the media selection to users. Each of the media players includes a control assembly structured to selectively control and regulate delivery of the media selection to the user, and at least one of the media players is selectively designatable as a slave unit. A master control assembly is further provided and is operatively associated with the media players, a connectivity assembly being included to establish a communicative link at least between the slave unit(s) and the master control assembly. The master control assembly is further structured to receive synchronization data from each of the media players, and to simultaneously and uniformly control the delivery of the media selection by the media players.

17 Claims, 4 Drawing Sheets

U.S. PATENT DOCUMENTS

| | | | |
|---|---|---|---|
| 5,781,730 | A | 7/1998 | Reimer et al. |
| 5,808,662 | A * | 9/1998 | Kinney et al. ............... 348/14.1 |
| 5,861,881 | A | 1/1999 | Freeman et al. |
| 5,898,429 | A | 4/1999 | Trom et al. |
| 5,973,679 | A | 10/1999 | Abbott et al. |
| 5,987,525 | A | 11/1999 | Roberts et al. |
| 6,006,241 | A | 12/1999 | Purnaveja et al. |
| 6,065,042 | A | 5/2000 | Reimer et al. |
| 6,094,671 | A | 7/2000 | Chase et al. |
| 6,118,445 | A | 9/2000 | Nonomura et al. |
| 6,122,658 | A | 9/2000 | Chaddha |
| 6,173,317 | B1 | 1/2001 | Chaddha et al. |
| 6,226,655 | B1 | 5/2001 | Borman et al. |
| 6,230,172 | B1 | 5/2001 | Purnaveja et al. |
| 6,230,207 | B1 | 5/2001 | Roberts et al. |
| 6,239,801 | B1 | 5/2001 | Chiu et al. |
| 6,240,459 | B1 | 5/2001 | Roberts et al. |
| 6,240,555 | B1 | 5/2001 | Shoff et al. |
| 6,337,947 | B1 | 1/2002 | Porter et al. |
| 6,438,751 | B1 | 8/2002 | Voyticky et al. |
| 6,490,580 | B1 | 12/2002 | Dey et al. |
| 6,519,771 | B1 | 2/2003 | Zenith |
| 6,529,949 | B1 | 3/2003 | Getsin et al. |
| 6,571,392 | B1 | 5/2003 | Zigmond et al. |
| 6,580,870 | B1 | 6/2003 | Kanazawa et al. |
| 6,678,866 | B1 | 1/2004 | Sugimoto et al. |
| 6,757,482 | B1 | 6/2004 | Ochiai et al. |
| 6,857,130 | B2 | 2/2005 | Srikantan et al. |
| 6,941,383 | B1 | 9/2005 | Getsin et al. |
| 6,944,621 | B1 | 9/2005 | Collart |
| 6,976,265 | B1 | 12/2005 | Yang et al. |
| 7,058,889 | B2 | 6/2006 | Trovato et al. |
| 7,103,908 | B2 | 9/2006 | Tomsen |
| 7,120,924 | B1 | 10/2006 | Katcher et al. |
| 7,136,571 | B1 | 11/2006 | Dagtas |
| 7,143,428 | B1 * | 11/2006 | Bruck et al. ................ 725/37 |
| 7,219,173 | B2 | 5/2007 | Sha et al. |
| 7,254,779 | B1 * | 8/2007 | Rezvani et al. ............ 715/745 |
| 7,428,504 | B2 | 9/2008 | Song |
| 7,434,154 | B2 | 10/2008 | Konetski |
| 7,464,172 | B2 | 12/2008 | Deshpande |
| 7,702,536 | B1 | 4/2010 | Alabraba et al. |
| 2001/0001865 | A1 | 5/2001 | Barraclough et al. |
| 2001/0005446 | A1 | 6/2001 | Uchikoga |
| 2001/0013068 | A1 | 8/2001 | Klemets et al. |
| 2001/0044726 | A1 | 11/2001 | Li et al. |
| 2002/0016820 | A1 | 2/2002 | Du Val et al. |
| 2002/0046083 | A1 | 4/2002 | Ondeck |
| 2002/0053083 | A1 | 5/2002 | Massey |
| 2002/0053089 | A1 | 5/2002 | Massey |
| 2002/0059342 | A1 | 5/2002 | Gupta et al. |
| 2002/0077988 | A1 | 6/2002 | Sasaki et al. |
| 2002/0078144 | A1 | 6/2002 | Lamkin et al. |
| 2002/0087569 | A1 | 7/2002 | Fischer et al. |
| 2002/0089519 | A1 | 7/2002 | Betz et al. |
| 2002/0090201 | A1 | 7/2002 | Betz et al. |
| 2002/0091658 | A1 | 7/2002 | Bae |
| 2002/0091762 | A1 | 7/2002 | Sohn et al. |
| 2002/0106191 | A1 | 8/2002 | Betz et al. |
| 2002/0116707 | A1 | 8/2002 | Morris et al. |
| 2002/0116708 | A1 | 8/2002 | Morris et al. |
| 2002/0120925 | A1 | 8/2002 | Logan |
| 2002/0131511 | A1 | 9/2002 | Zenoni |
| 2002/0152233 | A1 | 10/2002 | Cheong et al. |
| 2002/0161462 | A1 | 10/2002 | Fay et al. |
| 2002/0161797 | A1 | 10/2002 | Gallo et al. |
| 2002/0163533 | A1 | 11/2002 | Trovato et al. |
| 2002/0173273 | A1 | 11/2002 | Spurgat et al. |
| 2002/0180803 | A1 | 12/2002 | Kaplan et al. |
| 2003/0002849 | A1 * | 1/2003 | Lord ............................ 386/46 |
| 2003/0009485 | A1 | 1/2003 | Turner |
| 2003/0018609 | A1 | 1/2003 | Phillips et al. |
| 2003/0026587 | A1 | 2/2003 | Ostrover |
| 2003/0035646 | A1 | 2/2003 | Salvatori et al. |
| 2003/0046189 | A1 | 3/2003 | Asayama |
| 2003/0070181 | A1 | 4/2003 | Holm |
| 2003/0088515 | A1 | 5/2003 | Cooper et al. |
| 2003/0113096 | A1 | 6/2003 | Taira et al. |
| 2003/0115598 | A1 * | 6/2003 | Pantoja ........................ 725/40 |
| 2003/0140090 | A1 | 7/2003 | Rezvani et al. |
| 2003/0152366 | A1 | 8/2003 | Kanazawa et al. |
| 2003/0188255 | A1 | 10/2003 | Shimizu et al. |
| 2003/0191816 | A1 | 10/2003 | Landress et al. |
| 2003/0216922 | A1 | 11/2003 | Gonzales et al. |
| 2004/0054542 | A1 | 3/2004 | Foote et al. |
| 2004/0205830 | A1 | 10/2004 | Kaneko |
| 2004/0237084 | A1 | 11/2004 | Kurzweil et al. |
| 2004/0261127 | A1 | 12/2004 | Freeman et al. |
| 2005/0015815 | A1 | 1/2005 | Shoff et al. |
| 2005/0028195 | A1 | 2/2005 | Feinleib et al. |
| 2005/0058435 | A1 | 3/2005 | Chung et al. |
| 2005/0070361 | A1 | 3/2005 | Lau et al. |
| 2005/0086069 | A1 | 4/2005 | Watson et al. |
| 2005/0091679 | A1 | 4/2005 | Tanaka et al. |
| 2005/0107898 | A1 | 5/2005 | Gannon et al. |
| 2005/0108026 | A1 | 5/2005 | Brierre et al. |
| 2005/0117886 | A1 | 6/2005 | Kang et al. |
| 2005/0149759 | A1 | 7/2005 | Vishwanath et al. |
| 2005/0152683 | A1 | 7/2005 | Ryu |
| 2005/0182828 | A1 | 8/2005 | Lamkin et al. |
| 2005/0185929 | A1 | 8/2005 | Kang et al. |
| 2005/0193322 | A1 | 9/2005 | Lamkin et al. |
| 2005/0198574 | A1 | 9/2005 | Lamkin et al. |
| 2005/0235282 | A1 | 10/2005 | Anderson |
| 2005/0251749 | A1 | 11/2005 | Lamkin et al. |
| 2005/0265701 | A1 | 12/2005 | Lamkin et al. |
| 2005/0278435 | A1 | 12/2005 | Lamkin et al. |
| 2005/0278729 | A1 | 12/2005 | Lamkin et al. |
| 2006/0041639 | A1 | 2/2006 | Lamkin et al. |
| 2006/0041640 | A1 | 2/2006 | Lamkin et al. |
| 2006/0053056 | A1 | 3/2006 | Alspach-Goss et al. |
| 2006/0077773 | A1 | 4/2006 | Seo et al. |
| 2006/0143559 | A1 | 6/2006 | Spielberg et al. |
| 2006/0259469 | A1 | 11/2006 | Chiu |
| 2006/0272027 | A1 | 11/2006 | Noble |
| 2006/0277454 | A1 | 12/2006 | Chen |
| 2006/0287916 | A1 | 12/2006 | Starr et al. |
| 2007/0067707 | A1 | 3/2007 | Travis et al. |
| 2007/0100969 | A1 | 5/2007 | Hu |
| 2007/0143222 | A1 | 6/2007 | Chicks et al. |
| 2007/0160343 | A1 | 7/2007 | Sugimoto et al. |
| 2007/0168543 | A1 | 7/2007 | Krikorian et al. |
| 2007/0180387 | A1 | 8/2007 | Gravina et al. |
| 2007/0198632 | A1 | 8/2007 | Peart et al. |
| 2008/0046925 | A1 | 2/2008 | Lee et al. |
| 2008/0046956 | A1 | 2/2008 | Kulas |
| 2008/0270570 | A1 * | 10/2008 | Reed ............................ 709/217 |
| 2008/0279535 | A1 | 11/2008 | Haque et al. |
| 2009/0259633 | A1 | 10/2009 | Bronstein et al. |
| 2010/0115575 | A1 | 5/2010 | Yu et al. |

OTHER PUBLICATIONS

Final Office Action issued in U.S. Appl. No. 11/652,436 and mailed on Oct. 20, 2009.

Non-final Office Action issued in U.S. Appl. No. 11/400,889 and mailed on Jun. 3, 2010.

Non-final Office Action issued in U.S. Appl. No. 11/652,436 and mailed Jun. 17, 2010.

Non-final Office Action issued in U.S. Appl. No. 11/652,436 and mailed on Mar. 6, 2009.

Non-final Office Action issued in U.S. Appl. No. 12/380,701 and mailed on Dec. 1, 2009.

Notice of Allowance issued in U.S. Appl. No. 12/380,701 and mailed on Jun. 16, 2010.

Non-final Office Action issued in U.S. Appl. No. 12/380,701 and mailed on Mar. 18, 2010.

Non-final Office Action issued in U.S. Appl. No. 10/034,832 and mailed on Feb. 22, 2007.

Final Office Action issued in U.S. Appl. No. 10/034,832 and mailed on Jul. 19, 2007.

Advisory Action issued in U.S. Appl. No. 10/034,832 and mailed on Oct. 12, 2007.

Non-final Office Action issued in U.S. Appl. No. 10/034,832 and mailed on Jan. 16, 2008.

Non-final Office Action issued in U.S. Appl. No. 10/034,832 and mailed on Jul. 21, 2008.
Notice of Allowance issued in U.S. Appl. No. 10/034,832 and mailed on Jan. 14, 2009.
Restriction Requirement issued in U.S. Appl. No. 09/997,477 and mailed on Jun. 6, 2007.
Non-final Office Action issued in U.S. Appl. No. 09/997,477 and mailed on Oct. 3, 2007.
Final Office Action issued in U.S. Appl. No. 09/997,477 and mailed on Mar. 27, 2008.
Advisory Action issued in U.S. Appl. No. 09/997,477 and mailed on Jun. 12, 2008.
Non-final Office Action issued in U.S. Appl. No. 09/997,477 and mailed on Sep. 18, 2008.
Final Office Action issued in U.S. Appl. No. 09/997,477 and mailed on Apr. 27, 2009.
Advisory Action issued in U.S. Appl. No. 09/997,477 and mailed on Jul. 6, 2009.
Non-final Office Action issued in U.S. Appl. No. 09/997,477 and mailed on Sep. 29, 2009.
Notice of Allowance issued in U.S. Appl. No. 09/997,477 and mailed on Mar. 10, 2010.
Non-final Office Action issued in U.S. Appl. No. 11/716,763 and mailed on Sep. 22, 2009.
Restriction Requirement issued in U.S. Appl. No. 11/716,763 and mailed on Jun. 29, 2009.
Notice of Allowance issued in U.S. Appl. No. 11/716,763 and mailed Jun. 24, 2010.
Final Office Action issued in U.S. Appl. No. 11/652,436 and mailed on Oct. 19, 2010.
Final Office Action issued in U.S. Appl. No. 11/400,889 and mailed on Dec. 9, 2010.
Notice of Allowance issued in U.S. Appl. No. 11/716,763 and mailed on Nov. 24, 2010.
Non-final Office Action issued in U.S. Appl. No. 11/400,889 and mailed on May 9, 2011.
Non-final Office Action issued in U.S. Appl. No. 11/652,436 and mailed Apr. 12, 2011.
Non-final Office Action issued in U.S. Appl. No. 12/780,236 and mailed Mar. 30, 2011.
Final Office Action issued in U.S. Appl. No. 11/652,436 and mailed Jul. 13, 2011.
Notice of Allowance issued in U.S. Appl. No. 12/380,701 and mailed Jun. 10, 2011.
Final Office Action issued in U.S. Appl. No. 12/780,236 and mailed Aug. 31, 2011.
Non-final Office Action issued in U.S. Appl. No. 11/400,889 and mailed on Oct. 19, 2011.
Notice of Allowance on U.S. Appl. No. 11/652,436, mailed Oct. 26, 2011.
Non-final Office Action issued in U.S. Appl. No. 11/716,763 and mailed Mar. 15, 2012.
Final Office Action on U.S. Appl. No. 11/716763, mailed Jul. 3, 2012.
Non-Final Office Action on U.S. Appl. No. 11/527,279, mailed Jul. 12, 2012.
Final Office Action on U.S. Appl. No. 11/527,279, mailed Nov. 27, 2012.
Non-Final Office Action on U.S. Appl. No. 11/400,889, mailed Oct. 3, 2012.

* cited by examiner

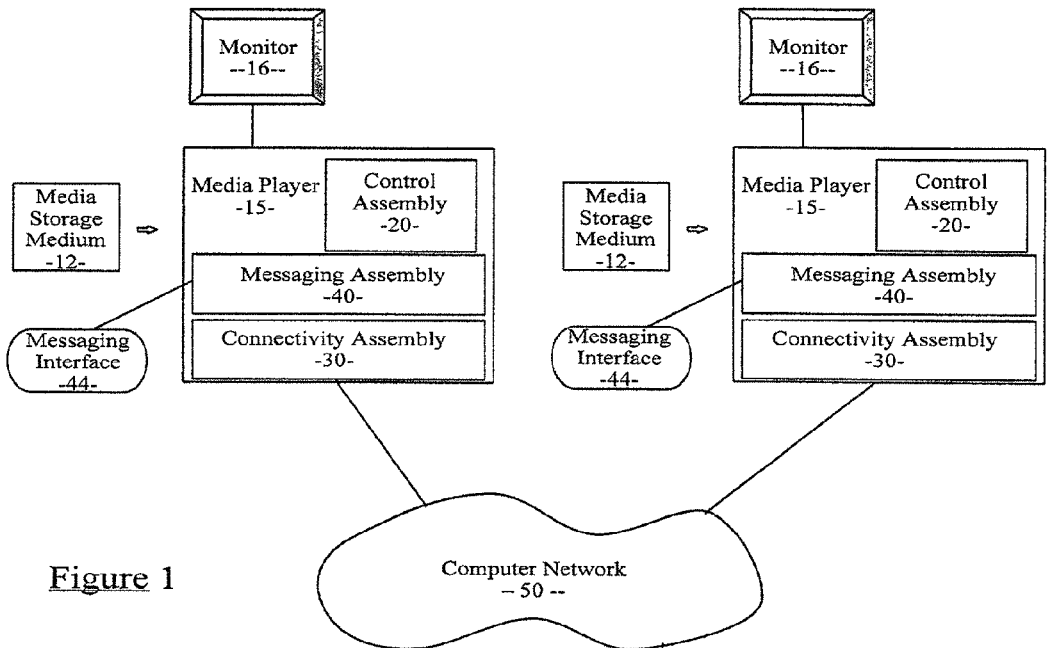
Figure 1
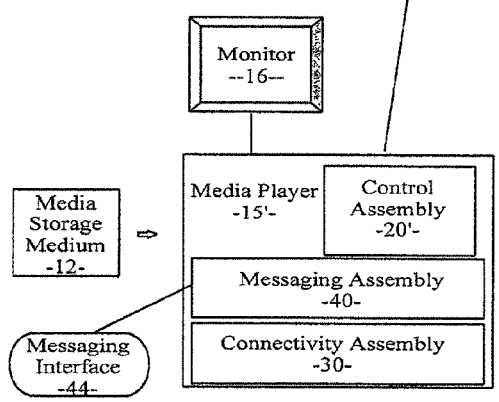

INTERACTIVE, MULTI-USER MEDIA DELIVERY SYSTEM

This application is a continuation application of U.S. patent application Ser. No. 09/997,477, filed Nov. 20, 2001, entitled "AN INTERACTIVE, MULTI-USER MEDIA DELIVERY SYSTEM", the contents of which are hereby incorporated by reference.

BACKGROUND OF THE INVENTION

1. Field of the Invention

The present invention relates to an interactive multi-user media delivery system which can be effectively employed with any conventional media type disposed on a corresponding storage medium, so as to provide substantially enhanced receipt of the media content and multi-user interactivity between one or more simultaneous recipients of the media selection. The present interactive multi-user media delivery system does not require any special programming and/or authorization on the storage medium and the media selection contained thereon, but rather operates to effectively allow an interactive multi-user viewing experience that can be managed directly and independently by individual users, and/or managed by a remote organizational concern such as a teacher, meeting organizer, movie studio, production company, advertiser, sponsor, etc.

2. Description of the Related Art

In entertainment and information related industries, informational and/or entertainment media are provided to users in a variety of conventional and advancing formats. Despite the availability of various types of media content utilizing transmission networks, such as broadcast, cable, satellite, fiber optic, Internet, etc., due to convenience, file size and/or copyright issues, a still very popular form for the delivery of media to a user is through the use of portable storage mediums that can be easily transported, owned by an individual, shared, rented, and/or mass produced for distribution and/or sale to a large number of users.

These various types of distributable media may include audio only media, such as on CD ROMS, conventional CDs, cassette tapes, floppy discs, digital storage chips, portable devices, and/or other storage devices, or can include audio-visual media, storable on similar types of portable storage medium as well as video cassettes, DVD's, video CD's and chipped based digital storage devices. Furthermore, each individual storage medium may include one or more particular media selection which are to be made available to the users utilizing a conventional play back device. As can be appreciated, the sale, rental and/or promotional distribution of content utilizing such portable storage medium is a very significant aspect of commerce.

Despite the benefits of being able to receive and enjoy media content independently, such as in a user's own home, one draw back associated with the utilization of a compact portable storage medium, may be the diminishment of group interaction and/or utilization of the media content. For example, in the entertainment industry it is widely recognized that when a group is able to view programming, such as a particular motion picture, together as a group, the viewing experience is often enhanced as the group may "feed off of one another" in responding to the media content. As a result, as technology changes and advances, and the sale and/or rental for home use of media content, such as motion pictures becomes an ever increasing and important part of the entertainment industry, this group interaction is sacrificed. Accordingly, there is a substantial need in the art for a media delivery system which will not interfere with a user's normal utilization and access to varying types of media content, but which will also allow a number of users to have an interactive and common media experience, whether it is independently initiated by users or sponsored by an interested party. Furthermore, such a system should permit uniform simultaneous viewing and control of any conventionally available, and/or to be developed media type and medium storage and play back system. For example, it is recognized, that a very large number of storage mediums have already been sold and/or distributed, and as such, the system should allow effective interaction and multi-user experiences with the conventionally programmed and/or configured storage mediums as well.

In addition to a large scale, multi-user viewing experience, it would also be beneficial to provide an easy to implement multi-user system so that as little as two users can enjoy a common media experience. AS can be appreciated, such a system would have a number of beneficial uses, including use by distant relatives to view home movies or a special movie selection together, or by friends and neighbors to have an interactive, group viewing experience without having to leave their homes. Moreover, such a system should preferably do more than merely allow simultaneous viewing, but should also allow interaction between the various users at remote locations.

In addition to the entertainment applications, it would also be beneficial to provide an interactive multi-user media delivery system which can be effectively utilized as an informational tool, whether in business or in the education industry. Specifically, it would be advantageous to provide a controllable information dissemination experience to any number of users and/or a number of locations without requiring special programming or encoding in the information itself. As a result, a large number of users can truly experience a simultaneous and interactive distribution of the information, be it a presentation, instructional materials, etc. Further, such a system should also provide a degree of interactivity between the varied users so as to eliminate the disadvantages of the isolating viewing scenario that must currently be experienced by viewers at different remote locations.

SUMMARY OF THE INVENTION

The present invention relates to an interactive multi user media delivery system. The media delivery system preferably includes at least two media storage mediums, each of which may contain at least a particular media selection. Furthermore, at least two media players capable of receiving and effectively delivering the media selection to a user from the storage mediums are also provided. Naturally, the delivery mode of the media may correspond to the type of media being delivered, such as using a video monitor for video and/or audio-video media, and/or speakers. Moreover, each of the media players includes a control assembly that selectively controls and regulates the delivery of the media selection to the user in a conventional manner, such as via the video monitor and/or audio monitor.

Within the context of the present media delivery system, at least one of the media players is preferable designatable as a slave a unit. Moreover, a master control assembly is further provided, and is operatively associated with the media players, and at least the slave media players, so as to effectively regulate and/or control the delivery of the media selection by each slave media player. The master control assembly may be configured to provide control inputs similar to those of the control assembly of the media players, and/or may provide additional control functions.

The master control assembly is preferably communicatively associated with at least the slave unit(s) via a connectivity assembly. Specifically, the connectivity assembly is structured to establish a communicative link at least between the slave unit(s) and the master control assembly for a preferred, although not required, two way transmission of information. Additionally, the master control assembly may be structured to receive synchronization data from each of the media players, such as by the connectivity assembly, and to accordingly simultaneously and uniformly control delivery of the media selection by the media players. Indeed, this simultaneous and uniform delivery of the media selection is achieved without requiring any specialized and/or specific programming on the media storage medium.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is a schematic representation of one embodiment of the interactive, multi-user media delivery system of the present invention;

Like reference numerals refer to like parts throughout the several views of the drawings.

DETAILED DESCRIPTION OF THE PREFERRED EMBODIMENT

Figure 2:
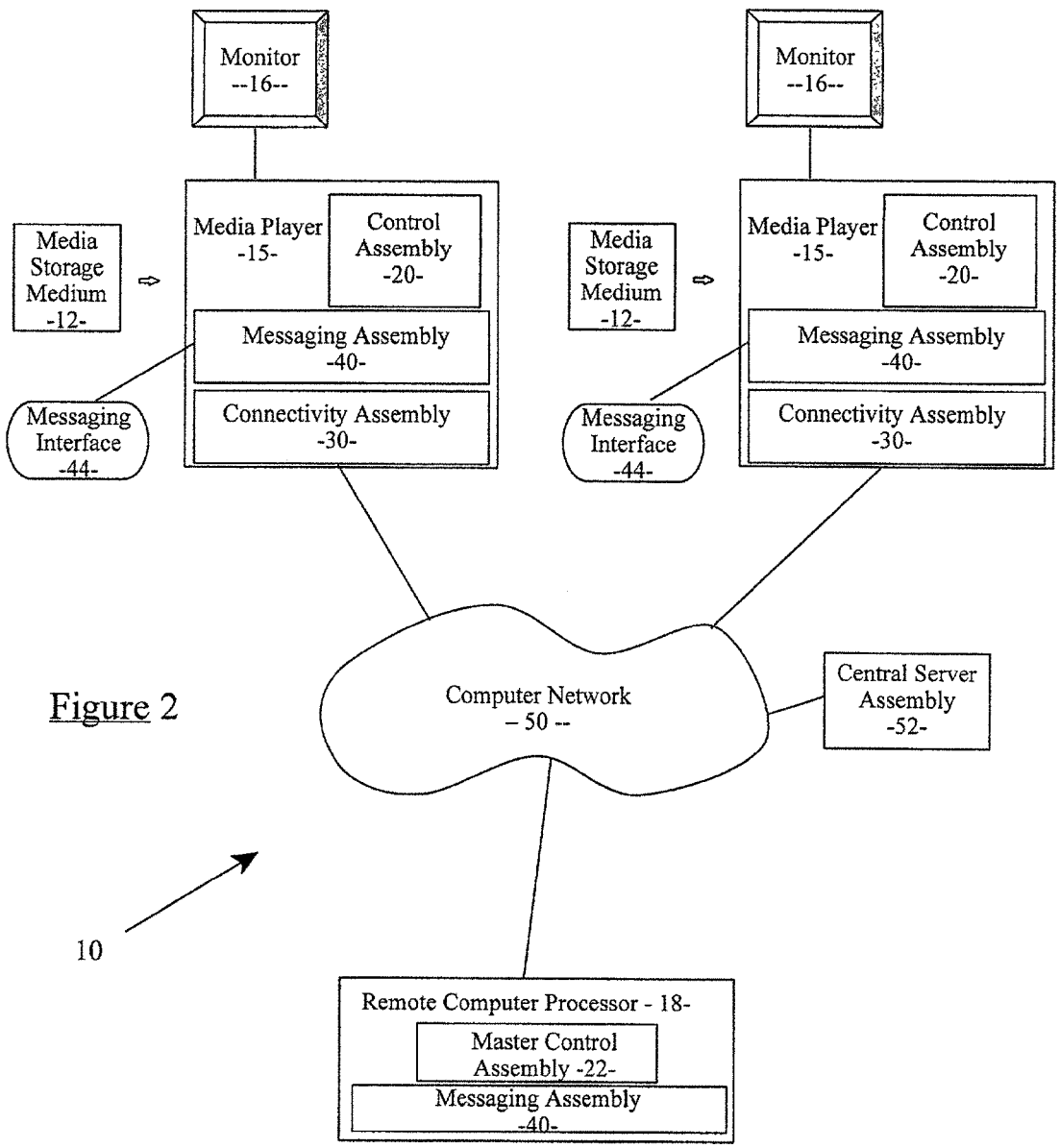
FIG. 2 is a schematic illustration of another embodiment present invention.

The present invention is directed towards an interactive, multi user, media delivery system, generally indicating as 10, and more specifically with a media player 15 configured for integration within the media delivery system 10 of the present invention. In particular, the media delivery system 10 of the present includes at least two but preferably a plurality of media players 15, 15'. The media players 15, 15' may be maintained and operated by users in a variety of locations which may be local or remote from one another. Furthermore, each of the media players 15, 15' is preferably configured to deliver a media selection to a user from a media storage medium 12 to be associated therewith. Specifically, the media players 15, 15' are preferably structured to deliver a media selection to a user, and may be structured to deliver any of a number conventionally available media types and formats. As such, the media players 15, 15' of the present invention may include an input assembly 17 to receive the storage medium 12 and a delivery assembly 23 that includes a media decoder 24 to deliver the corresponding type of media selection from the storage medium and a control assembly 20 which controls the delivery of the media selection as facilitated by an output assembly 19. Accordingly the delivery assembly may include or integrate video tape play back units, DVD play back systems, compact disk or digital music playback systems, such as MP3 players, video CD play back systems and/or digital memory stick, hard disk storage systems, personal (digital) video recorders or chip based play back systems. Further, the media players may be multi-media capable, such as in the form of a personal computer with media capabilities, combined DVD/MP3/Video CD player, etc. To this end, it is also recognized that although not necessary, it may be preferred that the media players be associated with digital media contained on media storage mediums 12 to be associated therewith. Further, each media player 15, 15' should have their own media storage medium 12 containing a corresponding media selection for playback, thus promoting the protection of copyright laws and requiring each user purchase or rent their own lawful copy. Moreover, it may also be seen that utilizing the system of the present invention, as will be described, an identifier for each media selection may also be communicated to a central authority so as to verify that an unauthorized copy is not being used. As such, users have incentive to purchase or obtain authorized copies of a media selection if they which to participate in the interactive experience available utilizing the present invention. Furthermore, although any desired type of encoding and/or programming may be made directly on the storage medium 12 or within the media selection, the storage mediums 12 may be structured in any conventional fashion usable on any corresponding device and do not require specialize encoding other than that normally required to achieve conventional utilization. Also, although not required, it is preferred that each storage medium 12 preferably includes a substantially identical or uniform copy of a particular media selection to be delivered utilizing the present system. Still, however, the media players 15, 15' need not be dedicated exclusively for the multi-user media delivery system 10 of the present invention, but rather they may also be configured for independent, relatively conventional utilization.

Each of the media players 15, 15' preferably includes a control assembly 20, 20'. The control assembly 20, 20' is incorporated so as to effectively regulate and control the delivery of the media selection to the user, such as via an associated monitor 16 for the purposes of an audio-video medium, or merely by way of an audio monitor in the case of a purely audio media selection. Along these lines, the control assembly may include such features as play, pause, rewind, fast forward and/or any other appropriate and/or desirable control functions which can effectively allow a user to regulate the delivery of the media selection or access other components or aspects of a media selection, as in the case of a DVD or CD.

The multi user media delivery system 10 of the present invention further includes a master control assembly. The master control assembly is structured to substantially simultaneously and uniformly control the delivery of the media selection by at least certain ones of the media players 15, 15' that are to be associated with the delivery of a specific media selection. To this end, the media selection is provided to a corresponding user of each active media player 15, 15' in a substantially synchronized, simultaneous and uniform fashion. As a result, a uniform, and collective viewing experience can be achieved for all of the users. Examples of the application of the multi user media delivery system 10 of the present invention will be described in greater detailed subsequently.

Looking first to the embodiment of FIG. 1, in one embodiment of the media delivery system 10 of the present invention one or a plurality of media players 15 are preferably designated, preferably selectively and/or temporarily, as slave unit(s). That is, the slave unit(s) are configured to be operated and/or controlled by the master control assembly at least with regard to media delivery. Likewise, in the embodiment of FIG. 1, any or one of the media players 15' may be designated as a master unit, its control assembly 20' functioning at least partially as the master control assembly which regulates and controls the delivery of the media by at least the slave media players 15 but preferably slave media players 15 as well as the corresponding master player 15'. In this regard, it is recognized that at least one slave media player 15 is designated, however, a virtually unlimited number of slave media players 15 may equivalently be provided and integrated within the media delivery system 10 of the present invention. Likewise, it is recognized that a large number of media players 15 may be available for designation as slave media players for a particular uniform viewing utilizing the media delivery system 10, however, not all may elect to participate and/or may be designated as slave media players 15 to be controlled by the master control assembly. Also, is recognized that although one media player 15' is preferably designated to define the master control assembly 20', designation as the master control assembly 20' may be shared by one or more media players, including the slave media players themselves, and/or may be switched or moved from one media player to another. As a result, independent users can organize and initiate a simultaneous delivery experience and can selectively share and/or give up control over the delivery. For example, any user or all users may be given master control assembly functionality to pause, rewind, stop, etc., a media delivery for some media players or all participating media players.

Turning to FIG. 2, in an alternative embodiment of the present invention an independent remote computer processor 18, which may be or may not be associated with a media player at all, may exclusively or in a shared manner include the master control assembly 22. In this embodiment, it is at least the remote computer processor 18 which directs the operation of all slave media player 15. Also, in this embodiment a particular user may elect to designate their media player as a slave media player 15, or may elect to retain control and not participate in a simultaneous media delivery. Furthermore, as mentioned, the individual slave media players 15 may also retain a certain degree of control over themselves, and/or may be allowed to act either temporarily or perpetually as the master control assembly either instead of or in addition to the master control assembly 22 of the remote computer processor 18.

From the proceeding, it is seen that the multi user media delivery system 10 of the present invention, either in the embodiment of FIG. 1 or FIG. 2 has a variety of uses and applications which will substantially enhance the delivery of media content by a media player of the present invention. One example of such a use of the multi user media delivery system 10 of the present invention may be for a specific motion picture and/or other audio video media premier on a portable storage medium 12 such as a DVD. In such a circumstance, users who are to participate in a simultaneous viewing of the DVD will have their own particular DVD as the storage medium 12 to be inserted at an appropriate time into their media player 15, 15' for effective viewing. At that point in time, producers, distributors, talent, etc. of the DVD utilizing the remote computer processor 18 as the master control assembly 22 and/or the utilization of a master player 15' are able to control and regulate a simultaneous viewing of the media selection by a large audience for a synchronize premier. Indeed, it is also recognized within such an application, a specially programmed DVD, such as provided within the system of U.S. Pat. No. 6,101,534, the contents of which are hereby incorporated by reference, may be provided such that the master control assembly can actually unlock content previously not available to the user conventionally by the media player. As a result, a controlled premier can be maintained with each individual user not being able to actually view the media selection in its entirety or at all unless unlocked as part of the uniform delivery. Similarly, additional enhanced content may be provided to the user so as to further enhance the delivery of the media selection, such as a directors cut, special features, etc. Of course, it is understood that the entertainment industry is not the only industry which could benefit from the multi user media delivery system 10 of the present invention. Alternatively, in the business and educational field, corresponding storage medium 12 can be delivered to one or a plurality of users, such as students or participants in a meeting at different offices, for placement into their media players 15, 15'. Utilizing the master control assembly 20', 22' a meeting organizer, and/or any user as desired by the meeting organizer, may effectively control the simultaneous delivery of the media selection, which can be a presentation, proposal, meeting notes, educational materials, etc. Further, as will be described subsequently, the communicative interactivity which is also preferably provided as part of the media delivery system 10 of the present invention provides a further enhanced degree of interactivity more than mere simultaneous receipt of the media selection.

In order to effectively achieve interactivity and communication between each of the various media players 15, 15' and/or a remote computer processor 18, each of the media players further preferably includes a connectivity assembly 30. The connectivity assembly 30 is configured so as to effectively provide communication between the media players 15, 15' and/or the remote computer processor 18, and as such may include a computer control assembly, such as utilizing a computer network 15 including the internet. In this regard, the connectivity assembly may be a specific dedicated connectivity assembly by which all media players 15, 15' and/or the remote computer processor assembly 18 can communicate in a dedicated fashion, and/or may include any conventional type of Internet access or public connection which allows for effective data transmission and input receipts to and from the media players 15, 15'. As such, a web enable media player 15, 15' may be integrated into the present system so as to provide the connectivity assembly 30 desired. Also in some embodiments, a central server 52 may also be provided and/or maintained so as to achieve appropriate management of the communication between the respective media players 15, 15' and/or remote computer processor 18. In this regard, the central server 52, utilizing for example a computer network 50, is able to regulate traffic to and from the individual media players 15, 15', and as will be described subsequently, may also regulate and/or control messaging and/or promotional activity to be associated with the delivery of the media selection.

Looking in further detail to the central server assembly 52, it is preferably structured to receive communicative inputs from media players 15, 15' and/or a remote computer processor 18, and to effectively communicate them in an understandable fashion to all of the media players and/or remote computer processor 18. Indeed in this regard, the central server assembly 52 may include the remote computer processor 18 that includes the master control assembly. Additionally, however, the central server assembly 52 is preferably, configured to act as a hub for the effective, interactive, managed communication of messaging traffic, as will be described, and moreover, to interact with the communication shell 60 associated with the messaging traffic, such as for the purpose of displaying promotional materials in conjunction with messaging traffic. For example, a promotional materials may be viewed as advertisements which may be displayed as part of the communication shell 60, as will be described, thus providing an auxiliary source of income in connection with the simultaneous and/or synchronized media delivery. As a result, the central server assembly 52 is structured to regulate, control and direct the delivery of promotional materials in connection with a play back control of the media players 15, 15' and/or the messaging activity of the media players 15, 15', the availability for the delivery being provided in exchange for the service of making available and/or managing the simultaneous media delivery and/or messaging. Of course, a paid or free service could be provided to users with or without additional promotional materials.

As indicated, the present invention also preferably includes a messaging assembly, generally 40. In particular, the messaging assembly 40 is configured so as to allow effective communication between users of the various media players 15, 15' and/or operators of the remote computer processor 18. The messaging assembly 40, which may be manipulated and/or controlled through the central server assembly 52 or through a direct pier to pier communication, allows for the further enhancement of the simultaneous viewing experience by allowing the user of one particular media player to communicate with all or a select one or group of other users utilizing other remotely located media players. Furthermore, the messaging assembly 40 is preferably configured to operate while the media content is being delivered to the user utilizing the media player, thus allowing a degree of real time interactivity between the media selection being presented and the various users.

The messaging assembly 40 of the present invention may be configured so as to provide audio messages, video messages, audio/video messages and/or text messages between the various users. In this regard, a messaging interface 44 is preferably provided. The messaging interface 44 preferably corresponds at least the type of interactive messaging communication that can be achieve utilizing a particular media player. As such, the messaging interface 44 may include a keyboard, mouse, video camera, pointer, remote control unit, voice recognition module, microphone and/or any other type of communication interface. As such, a message received at a corresponding media player at which it is delivered is communicated utilizing the connectivity assembly 30 to a select one, group or all other media players and/or remote computer processor(s) 18.

Figure 3:
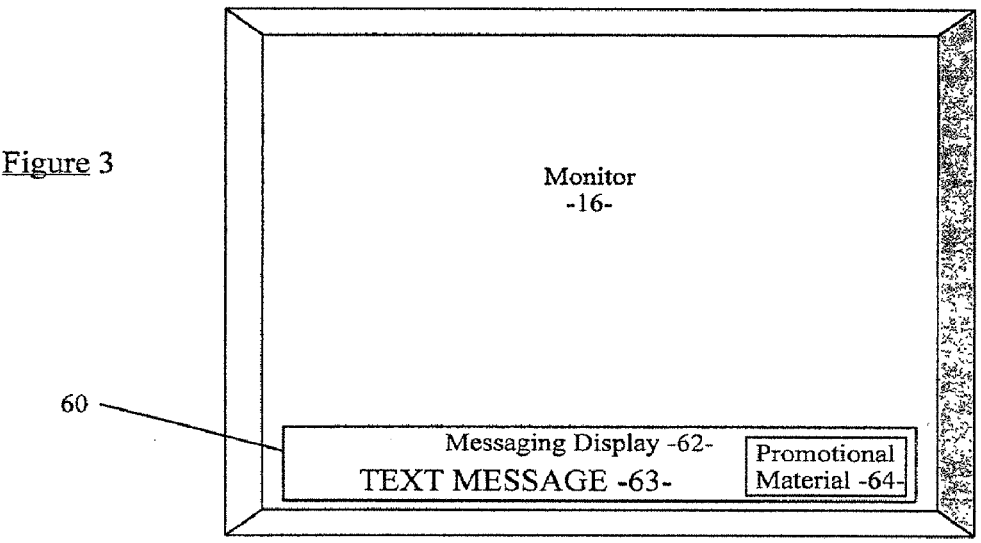
FIG. 3 is an illustration of one monitor assembly utilized in conjunction with a media player of the delivery system of the present invention, the monitor, including one embodiment of the messaging display of the communication shell.
Figure 4:
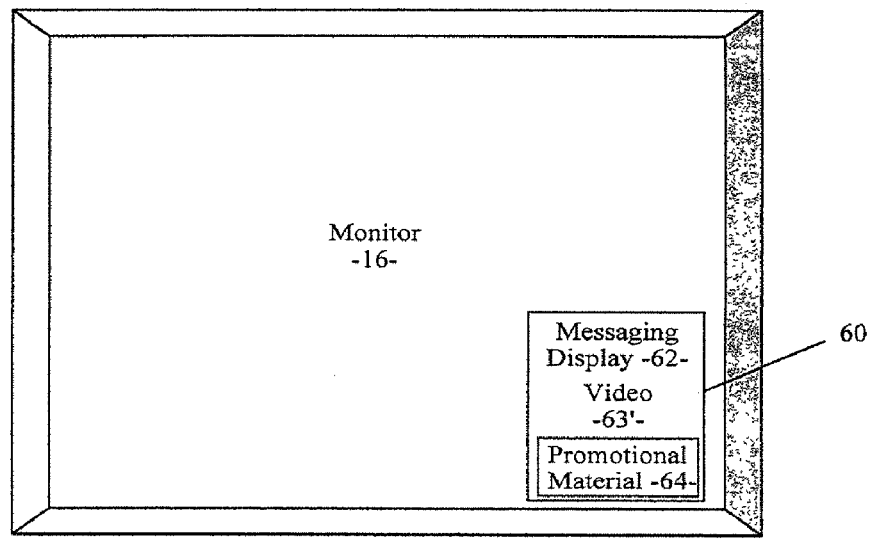
FIG. 4 is an illustration of an alternative embodiment of the messaging display of the communication shell.
Figure 5:
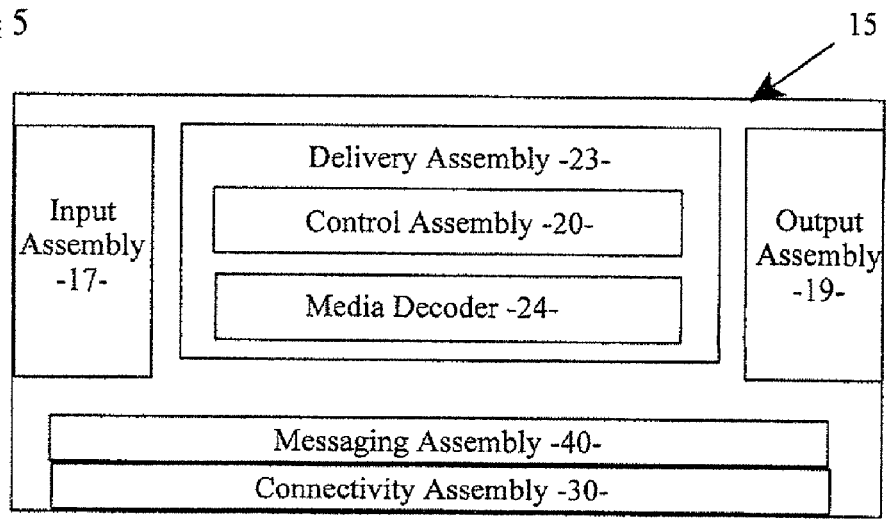
FIG. 5 is a schematic representation of an embodiment of the enhanced media player of the present invention.

Although an audio only message may be provided whereby an audio message is communicated utilizing the normal audio facilities associated with media player, in a preferred embodiment wherein the media player communicates the media selection to a user utilizing an associate monitor 16, a communication shell 60, as illustrated in FIGS. 3 and 4 is preferably provided. Specifically, the communication shell 60 is included and associated with the delivery of one or more messages to a corresponding user of a specific media player. In the illustrated embodiment the communication shell 60 includes a messaging display 62 which may be defined as a segregated or select area of the monitor 16 via which messaging communication is achieved. For example, the communication shell 60 may define a template area that overlies the appropriate media display section of the monitor 16, and/or may provide a segregated area of the monitor 16 for containment of the messaging display 62. Furthermore, if desired, the communication shell 60 may be defined so as to reserve an area of the monitor 16 display for when messaging communication is desired, however, remain substantially or generally un-obtrusive when messaging communication is not taking place. Also, appropriate movement and/or re-positioning of the messaging display may also be provided.

Looking first to the embodiment of FIG. 3, the messaging display 62 may include a select area wherein a text message 63 may be viewed. This viewing of the text message 63 may be in the context of viewing a received message or of typing and/or entering in a text message by a user of the corresponding media player utilizing the messaging interface and then subsequently accepting the written text message 63 for effective communication to one or more other users. Alternately, however, the messaging display 62 of the communication shell 60 may include a video display 63' as in FIG. 4. The video display 63' is preferably utilized for video communication between the respective users such that users at various different locations utilizing different media players can see one another and can interact in a more face to face type manner. In such an embodiment, preferably an audio component will also be provided, such as a microphone which may be associated with a video camera or be distinct therefrom. Of course, if desired text messaging can be integrated with the video display 63', as well as other features including the use of special effects and/or animations so as to enhance a video representation of the user and/or to actually define the video representation of the user in cases where the users do not wish to be video taped. Accordingly, in such an embodiment person at remote locations, such as a grandparent and grandchild in different parts of the country can effectively watch a media selection together and cab see one another watching the media selection and interact with one another as desired.

Looking further to the communication shell 60 associated with the messaging assembly 40, it is also preferred that promotional materials be deliverable utilizing the communication shell 60. In particular, the promotion materials 64, which may be included within the messaging display 62 and/or may be separated therefrom, are provided to a user who is viewing the media selection via the monitor 16 of the present system. Of course, the promotional material 64 can be any type of materials, whether associated with the specific media selection or whether completely separate therefrom and merely provided as a source of income relative to the facilitation of the connectivity between remote users. Furthermore, the promotional materials 64 may be tailored to specific users, if desired, or may be customized to change depending on the situation and/or the circumstance, or in accordance with the portion and/or section of the media selection being provided to the user. Additionally, if desired, the promotional material 64 may themselves define an interactive link which may be effectively selected by a user, such as utilizing a pointer control, so as to provide additional information regarding the promotional material 64 being displayed and/or by saving information for later viewing and/or later access.

In addition to or instead of providing one or more promotional materials 64 as interactive links, it is also recognized that interactive links may be effectively provided within the messaging display 62 for various other purposes as well. For example, users may wish to communicate interactive links to associated computer website(s) or additional information and/or interactive links may be provided as selectable user responses to a query that may be presented between users or from operators of the master control assembly. For example, it may be desirable to poll users so as to get opinions regarding the media selection, as in the case of a premier or product presentation, or it may be desirable to provide a quiz to users, such as for an instructional use in the context of a test or in an entertainment aspect for purposes of winning prizes and/or for pure entertainment value. As a result, the communication shell 60 provides an interactive area within which the users can effectively interact while still effectively experiencing the media selection on the monitor 16 and other appropriate media medium. Furthermore, the programming for the messaging assembly 40, including the communication shell 60, is preferably integrated into the media players 15, 15' themselves and as a result any media selection may be effectively utilized. Indeed, although as indicated it is preferred that the same media selection be simultaneously viewed on each of the various media players so as to provide a group type experience, it is also understood that the messaging facilities and communicative facilities in the present invention may also be effectively utilized even when different media selections are being played on each corresponding media player.

Finally, in order to effectively delivered the media selection to all users in a simultaneous, synchronized fashion, synchronization data is preferably communicated at least to the master control assembly. This synchronization data may include a location designator associated with the media selection, such as a time code and/or track number of the media selection which identifies effectively what in the specific media selection is being displayed. Likewise, the synchronization data may include a title of a media selection and/or any other information that may be periodically polled and/or provided on a one time basis at the commencement of the programming.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents. Furthermore, it is also recognized that a majority of the programming required to define the assemblies of the media player of the present system can be pre-programmed into the player's processor, encoded onto a chip or similar storage device for introduction into the player, or may be loaded per use or permanently onto the processor of a player, such as from a local or remote storage device.

Now that the invention has been described,

What is claimed is:

1. A media player comprising:
   a hardware processor;
   input logic configured to receive a media storage medium that includes a media selection;
   connectivity logic configured to associate delivery logic of the media player with master control logic; and
   messaging logic configured to deliver a message to another media player during delivery of the media selection, wherein the message includes at least an audio message, wherein a representation associated with the message is incorporated into the media selection in a communication shell, and wherein one or more promotional materials are included in the communication shell along with the representation associated with the message;
   wherein the delivery logic is configured to communicate synchronization data related to the media selection to the master control logic, wherein the synchronization data includes an identifier of the media selection and a location designator indicative of a portion of the media selection that is being delivered at a point in time, and wherein the delivery logic is configured to at least temporarily permit the master control logic to control delivery of the media selection.

2. The media player of claim 1, wherein the message further comprises at least one of a text message or a video message.

3. The media player of claim 1, wherein the one or more promotional materials are based on the portion of the media selection that is being delivered.

4. The media player of claim 1, wherein the delivery logic includes at least a media decoder and control logic.

5. The media player of claim 4, wherein the media decoder is configured to deliver the media selection from the media storage medium via output logic.

6. The media player of claim 5, wherein the control logic is configured to control the delivery of the media selection by the media decoder.

7. The media player of claim 1, wherein the master control logic is disposed in a server that is remotely located from the media player.

8. The media player of claim 1, wherein the connectivity logic is further configured to receive a designation of the media player as a slave media player.

9. The media player of claim 1, wherein the media selection comprises a presentation.

10. The media player of claim 1, wherein the identifier includes information that allows the master control logic to verify whether the media selection is authorized.

11. A method comprising:
    receiving, at input logic of a media player that includes a memory, a media storage medium that includes a media selection;
    associating delivery logic of the media player with master control logic;
    transmitting, by messaging logic of the media player, a message to another media player during delivery of the media selection, wherein the message includes at least an audio message, wherein a representation associated with the message is incorporated into the media selection in a communication shell, and wherein one or more promotional materials are included in the communication shell along with the representation associated with the message; and
    transmitting, by the delivery logic of the media player, synchronization data related to the media selection to the master control logic, wherein the synchronization data includes an identifier of the media selection and a location designator indicative of a portion of the media selection that is being delivered at a point in time, and wherein the delivery logic is configured to at least temporarily permit the master control logic assembly to control delivery of the media selection.

12. The method of claim 11, wherein the one or more promotional materials are based on the portion of the media selection that is being delivered.

13. The method of claim 11, further comprising receiving a designation of the media player as a slave media player.

14. The method of claim 11, wherein the identifier includes information that allows the master control logic to verify whether the media selection is authorized.

15. A media player comprising:
    a memory;
    logic for receiving a media storage medium that includes a media selection;
    logic for associating delivery logic of the media player with a master control logic;
    logic for transmitting a message to another media player during delivery of the media selection without interrupting the delivery of the media selection, wherein the message includes at least an audio message, wherein a representation associated with the message is incorporated into the media selection in a communication shell, and wherein one or more promotional materials are included in the communication shell along with the representation associated with the message; and logic for transmitting synchronization data related to the media selection to the master control logic, wherein the synchronization data includes an identifier of the media selection and a location designator indicative of a portion of the media selection that is being delivered at a point in time, and wherein the delivery logic is configured to at least temporarily permit the master control logic to control delivery of the media selection.

16. The media player of claim 15, wherein the one or more promotional materials are based on the portion of the media selection that is being delivered.

17. The media player of claim 15, wherein the master control logic is disposed in a server that is remotely located from the media player.

* * * * *

UNITED STATES PATENT AND TRADEMARK OFFICE
CERTIFICATE OF CORRECTION

PATENT NO. : 8,396,931 B2
APPLICATION NO. : 12/771004
DATED : March 12, 2013
INVENTOR(S) : Rothschild Page 1 of 1

It is certified that error appears in the above-identified patent and that said Letters Patent is hereby corrected as shown below:

On Title Page 3, item (56), under "OTHER PUBLICATIONS", in Column 2,
Line 23, delete "11/716763," and insert -- 11/716,763, --, therefor.

In the Specification

In Column 3, Lines 28-29, delete "embodiment present" and insert -- embodiment of the interactive, multi-user media delivery system of the present --, therefor.

In Column 6, Line 14, delete "control assembly 20', 22'" and insert -- control assembly 20, 20' --, therefor.

In Column 6, Lines 31-32, delete "computer network 15" and insert -- computer network 50 --, therefor.

In Column 7, Line 50, delete "FIGS. 3 and 4 is" and insert -- FIGS. 3 and 4, is --, therefor.

Signed and Sealed this
Fifth Day of August, 2014

Michelle K. Lee
*Deputy Director of the United States Patent and Trademark Office*